United States Patent [19]
Clark

[11] 3,821,926
[45] July 2, 1974

[54] MULTI-PURPOSE OUTDOOR GRILL

[76] Inventor: Keith E. Clark, 767 Lindo Ln., Chico, Calif. 95926

[22] Filed: Feb. 23, 1972

[21] Appl. No.: 228,566

[52] U.S. Cl............... 99/340, 99/421 H, 99/449, 99/450, 126/25
[51] Int. Cl. ........................................ A47j 37/07
[58] Field of Search ....... 99/340, 419, 420, 421 A, 99/421 H, 449, 450; 126/9, 25; 211/106, 119, 134, 181

[56] References Cited
UNITED STATES PATENTS

| R4,652 | 11/1871 | Roe | 99/450 |
| 180,519 | 8/1876 | Badger | 99/450 |
| 1,096,002 | 5/1914 | Stopple | 126/29 |
| 3,330,204 | 7/1967 | Little | 99/450 X |

FOREIGN PATENTS OR APPLICATIONS

| 845,826 | 5/1939 | France | 99/421 H |

Primary Examiner—Billy J. Wilhite
Assistant Examiner—Arthur O. Henderson
Attorney, Agent, or Firm—Phillips, Moore, Weissenberger, Lempio & Strabala

[57] ABSTRACT

An outdoor grill comprises at least two laterally spaced and horizontally disposed primary support rods having a plurality of transversely disposed secondary support rods loosely attached thereto by eyelets formed thereon. In a grill embodiment of this invention, three such primary support rods are utilized and each secondary support rod has three eyelets formed thereon to provide a substantially large, flat grill. In barbecue and oven embodiments, a horizontal grill portion has a pair of vertically disposed secondary support rods mounted on each end of two primary support rods and a horizontal spit rod is attached between such pairs and above the grill portion.

6 Claims, 4 Drawing Figures

PATENTED JUL 2 1974 3,821,926

3,821,926

MULTI-PURPOSE OUTDOOR GRILL

BACKGROUND OF THE INVENTION

The popularity of outdoor hiking and camping dictates the need for compact and lightweight utensils which can be carried in a knapsack. In addition to such desiderata, outdoor grills or barbecues must exhibit a high degree of structural integrity and ability to be quickly assembled and disassembled. Conventional outdoor grills and the like have failed to meet such requirements prior to the advent of this invention.

SUMMARY OF THE INVENTION

An object of this invention is to overcome the above, briefly described problems by providing an economical, compact and lightweight outdoor grill or the like which exhibits a high degree of structural integrity and ability to be quickly assembled and disassembled.

The grill comprises at least two primary support rods and a plurality of transverse secondary support rods loosely attached thereto by eyelet means. The assembled device may take the form of a flat grill, a barbecue, an oven or any similar utensil.

BRIEF DESCRIPTION OF THE DRAWINGS

Further objects of this invention will become apparent from the following description and accompanying drawings wherein.

DETAILED DESCRIPTION

Figure 1:
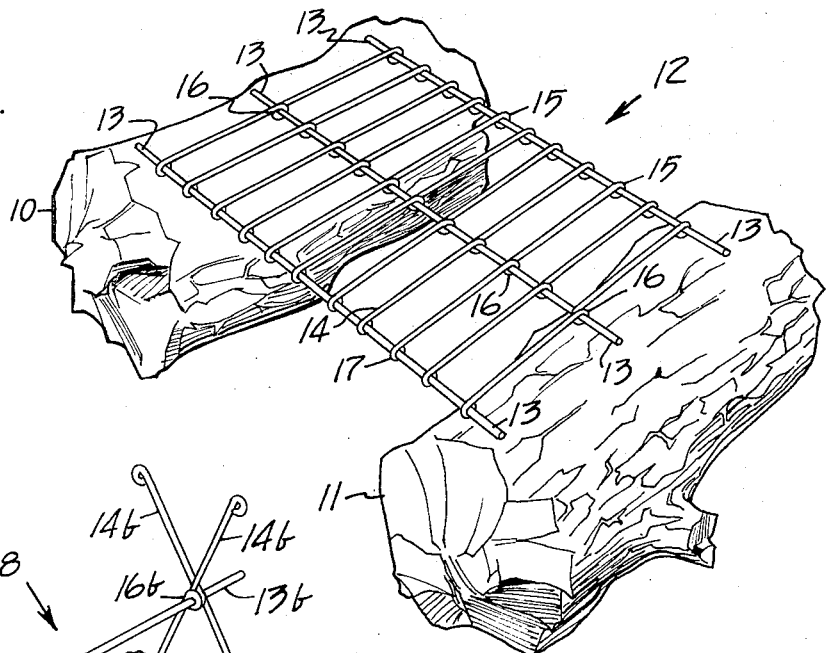
FIG. 1 illustrates a flat grill embodiment of this invention.
Figure 4:
FIGS. 3 and 4 are side elevational and top plan views, respectively, of a secondary support rod employed in the FIGS. 1 and 2 embodiments.
Figure 3:
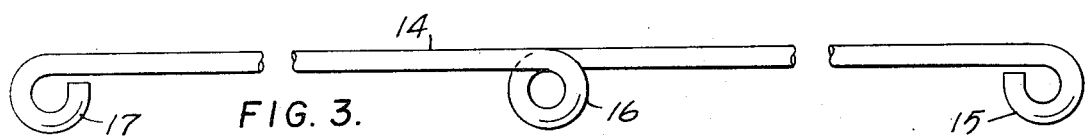

FIG. 1 illustrates a typical camping application of this invention wherein spaced logs 10 and 11 have a horizontally disposed, flat grill 12 mounted therebetween. The grill comprises three identical and laterally spaced primary support rods 13 having a plurality of identical secondary support rods 14 loosely attached thereto in transverse relationship. Referring to FIGS. 3 and 4, each rod 14 preferably comprises a round barstock suitably fabricated to form equally spaced eyelet means 15, 16 and 17 thereon.

Each of the eyelet means has an inner diameter (e.g., 0.255 in.) which is slightly larger (e.g., 0.005 in.) than the outside diameter of each rod 13 to permit the rods to move relative to each other. Outer eyelet means 15 and 17 are preferably formed by bending each end of a straight rod through more than 180° whereas intermediate eyelet means 16 is formed by bending the rod through approximately 360°. Rods 13 and 14 preferably have round cross sections and comprise a non-toxic and rustproof material (e.g., type 304 stainless steel round), which will withstand the high temperatures normally generated by campfires.

In one specific application of the FIG. 1 grill embodiment, parallel rods 13 were 23 inches long whereas parallel rods 14 were 11 inches long. Eleven parallel rods 14 were longitudinally axially spaced along rods 13 to form a flat grill adapted for grilling and cooking purposes. In this embodiment, the three laterally spaced rods 13 project through aligned eyelet means 15, 16 and 17, respectively, to permit rods 14 to be moved to any desired position along rods 13.

Figure 2:
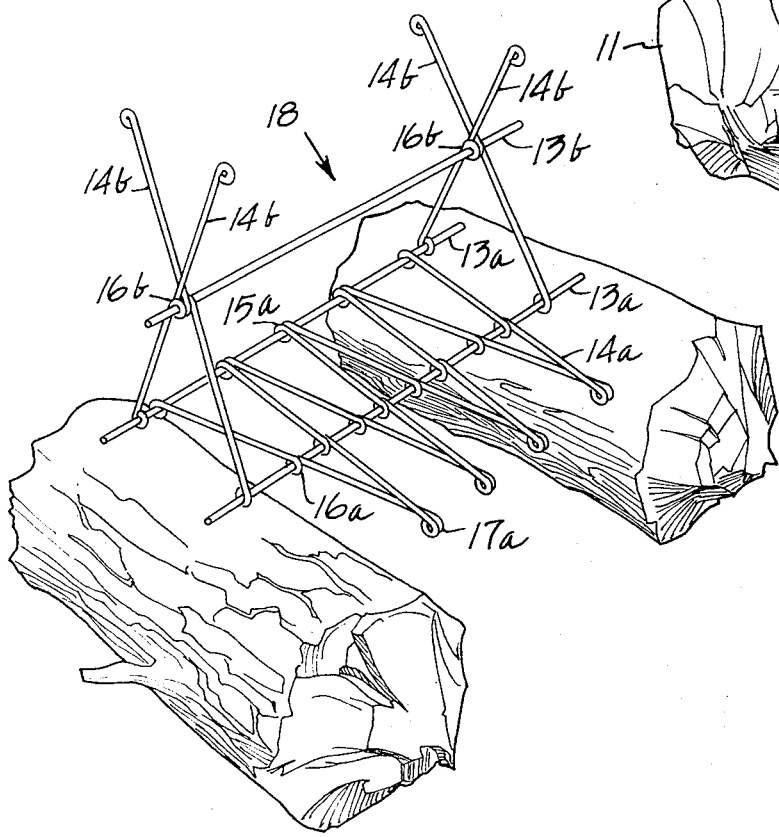
FIG. 2 illustrates a barbecue and oven embodiment.

FIG. 2 illustrates a barbecue embodiment 18 of this invention wherein the individual primary and secondary support rods are identical to the like numbered rods shown in FIG. 1. Such embodiment comprises two horizontally disposed primary support rods 13a projecting through eyelet means 15a and 16a, respectively, of a plurality of horizontally disposed secondary support rods 14a to form a grill portion. Each pair of rods 14a generally forms a V-shape having its apex defined at adjacent first eyelet means 15a and its base defined between second eyelet means 16a which are widely spaced longitudinally.

A pair of generally vertically disposed secondary support rods 14b cross adjacent to their centers and are attached to respective primary support rods 13a by lower eyelet means. Upper eyelet means 16b formed on each rod 14b are aligned to have a horizontally disposed rod 13b extend therethrough to form a spit. It should be noted that the upper eyelet means for retaining spit rod 13b could constitute those positioned above eyelet means 16b to thus raise the spit rod to a higher vertical position.

From the above description it can be seen that the interchangeable rods of this invention are multi-purpose in that they may be used for various utensil applications. For example, the FIG. 2 barbecue arrangement may have a sheet of foil placed over spit rod 13b to form a substantially closed reflector oven. Also, the FIG. 2 barbecue arrangement could be placed upside down to form a stand or the like. Regardless of the type of device which is assembled, said device can be quickly disassembled and packaged by detaching the rods and by placing them in a narrow tube (not shown) for packing purposes.

What is claimed is:

1. An outdoor grill or the like comprising
    at least three primary support rods, spaced relative to each other, each of said primary support rods being straight throughout the entire length thereof, and a plurality of secondary support rods, spaced relative to each other, attaching said primary support rods together and transversely disposed relative thereto, each of said secondary support rods having at least three eyelet means formed thereon, each eyelet means of each secondary support rod loosely attaching such secondary support rod on a respective one of said primary support rods for permitting said primary and secondary support rods to be moved and disassociated relative to each other said primary and secondary support rods being horizontally disposed to form a flat grill with said primary support rods being at least generally disposed in parallel relationship with respect to each other and at least three of said secondary support rods being at least generally disposed in parallel relationship with respect to each other and at least generally perpendicular to said primary support rods.

2. The invention of claim 1 wherein each of said primary and secondary support rods comprises a round cross section and wherein each of said secondary support rods is bent to form said eyelet means therein.

3. The invention of claim 2 wherein each of said secondary support rods solely comprises an outer eyelet means formed at each end thereof and an intermediate eyelet means formed intermediate said outer eyelet means.

4. An outdoor grill or the like comprising at least three primary support rods, spaced relative to each other, each of said primary support rods being straight and constituting a round cross section throughout the entire length thereof, and a plurality of secondary support rods, spaced relative to each other, attaching said primary support rods together and transversely disposed relative thereto, each of said secondary support rods having at least three eyelet means formed thereon, each eyelet means of each secondary rod loosely attaching a respective one of said primary support rods for permitting said primary and secondary support rods to be moved and disassociated relative to each other, each of said secondary support rods solely comprising an outer eyelet means formed at each end thereof and an intermediate eyelet means formed intermediate said outer eyelet means, each of said outer eyelet means being formed by a bend in said secondary support rod of more than 180° and said intermediate eyelet means being formed by a bend in said secondary support rod approximating 360°.

5. An outdoor grill or the like comprising at least two primary support rods, spaced relative to each other, each of said primary support rods being straight and constituting a round cross section throughout the entire length thereof, and at least three secondary support rods, spaced relative to each other, attaching said primary support rods together and transversely disposed relative thereto, each of said secondary support rods having at least three eyelet means formed thereon, first and second eyelet means of each secondary support rod loosely attaching such secondary support rod on the respective primary support rods for permitting said primary and secondary support rods to be moved and disassociated relative to each other, all of said primary and secondary support rods being horizontally disposed to form a flat grill, and wherein at least two of said primary support rods are at least generally disposed in parallel relationship with respect to each other and wherein each adjacent pair of secondary support rods generally forms a V-shape with respect to each other to position the first eyelet means of first and second secondary support rods closely adjacent to each other on a first one of said primary support rods and first eyelet means of said second and a third secondary support rod being spaced longitudinally along a second primary support rod, the third eyelet means of said secondary support rods extending laterally beyond said second primary support rod in cantilevered relationship therewith.

6. An outdoor grill or the like comprising at least two primary support rods, spaced relative to each other, each of said primary support rods being straight throughout its entire length, and a plurality of identical secondary support rods, spaced relative to each other, attaching said primary support rods together and transversely disposed relative thereto, each of said secondary support rods having at least three eyelet means formed thereon, each of said eyelet means loosely attaching said secondary support rods on a respective one of said primary support rods for permitting said primary and secondary support rods to be moved and disassociated relative to each other, at least two of said primary support rods and some of said secondary support rods being horizontally disposed to form a grill portion and at least two pairs of said secondary support rods being at least generally vertically disposed relative to said grill portion with each pair being crossed, each secondary support rod of each pair of secondary support rods being attached at its lower eyelet means and each having a middle eyelet means of said three eyelet means formed thereon, positioned vertically above said grill portion, aligned with the middle eyelet means of the other secondary support rod of said pair and an at least generally horizontally disposed spit rod extending through the aligned middle eyelet means of said pairs of secondary support rods to form a barbecue with said grill portion.

* * * * *